United States Patent [19]

Gaucher et al.

[11] Patent Number: 5,263,404
[45] Date of Patent: Nov. 23, 1993

[54] ANTI-ROTATION WIPER RING

[75] Inventors: John J. Gaucher, Windham, N.H.; Frank Van Vleet, Andover, Mass.; Daniel Shannon, Washington, Pa.

[73] Assignee: A.W. Chesterton Company, Stoneham, Mass.

[21] Appl. No.: 819,089

[22] Filed: Jan. 9, 1992

[51] Int. Cl.[5] .............................................. F16J 15/18
[52] U.S. Cl. ..................................... 92/168; 277/181; 277/24; 277/186; 277/189
[58] Field of Search ..................... 92/168; 277/24, 136, 277/181, 182, 189, 124, 206 R, 152, 186

[56] References Cited

U.S. PATENT DOCUMENTS

| 2,899,938 | 8/1959 | Gardner | 92/168 |
| 4,240,643 | 12/1980 | Becker et al. | 277/186 |
| 4,261,583 | 4/1981 | de Vries, Jr. et al. | 277/189 |
| 4,425,838 | 1/1984 | Pippert | 277/24 |

FOREIGN PATENT DOCUMENTS

| 564674 | 2/1958 | Belgium | 277/181 |
| 1187872 | 2/1965 | Fed. Rep. of Germany | 277/181 |
| 1334849 | 7/1963 | France | 277/24 |
| 2429917 | 2/1980 | France | 92/168 |
| 13445 | 6/1969 | Japan | 277/189 |
| 1504447 | 8/1989 | U.S.S.R. | 277/181 |
| 1313478 | 4/1973 | United Kingdom . | |

OTHER PUBLICATIONS

UK Official Search Report—Date of Search 8 Feb. 1993.
Chesterton Hydraulic/Pneumatic Cylinder Seals product circular (1983).
Chesterton Hydraulic/Pneumatic Cylinder Upgrade Program product announcement.
Parker Seals product circular (1989).
Freudenberg-NOK Hydraulic Seals Engineering Manual and Catalog.
Merkel, Die Passende Antwort product circular.

*Primary Examiner*—Thomas E. Denion
*Attorney, Agent, or Firm*—Lahive & Cockfield

[57] ABSTRACT

An anti-rotation wiper ring for mounting in a pump equipment gland concentrically to the equipment pump rod, the ring having a wiper lip for preventing debris from being carried on the rod retracting within the equipment. Structure prevents the ring from rotating inwardly toward the rod and possibly outwardly thereafter out of the pump. In one embodiment, the wiper ring flange is held in the gland receiver groove via an anti-rotation anchor on the flange bottom surface mating with a gland locking groove on the bottom surface of the gland receiver groove. Alternatively or additionally, a stabilizer device is formed on the ring ID and prevents the ring's inward rotation. The stabilizer has standoffs to allow the passing rod to glide by while a recession above the standoffs reduces drag. Reliefs between the standoffs harmlessly pass any pressure which may escape the pump piston seal. A static seal keeps a potential leakage path closed in between the wiper ring OD and gland receiver groove ID.

20 Claims, 4 Drawing Sheets

5,263,404

ANTI-ROTATION WIPER RING

BACKGROUND OF THE INVENTION

The present invention relates to a wiper ring for removing debris from the surface of the rod of a mechanical pump as the rod is retracted into the pump.

In a typical mechanical pump jack, a hydraulic (or Pneumatic) actuator builds or relieves a fluid head in a cylindrical pump chamber, which drives the piston-like pump rod along a Pump longitudinal axis. The pump is sealed from the environment at a pump gland which is mounted at the end of the pump housing and through which the rod is driven, with the far end of the rod extending outside of the pump.

There are two primary sealing tasks in such equipment. First, the pump fluid must be sealed within the pump. Accordingly, a piston ring is mounted in the gland and the rod extends through the piston ring to seal the fluid in the pump chamber. But equally as important, foreign material (dirt, abrasives, dust, fluids) must be prevented from entering into the pump. Such contaminants can cause fouling and corrosion within the pump, can cause scoring of the rod itself, and can reduce the life of the rod, rod bushings, and the piston seals.

As to the latter sealing task, typically a wiper ring whose OD is captured within a receiver groove on the ID of the gland is provided to exclude contaminants carried on the rod from entering into the pump. The top of the wiper ring includes a wiper lip which cleans the foreign material off of the surface of the sliding rod as it retracts into the pump. However, the portion of the wiper ring contacting the rod puts a drag on the rod, and too much drag can cause the ring to bind to the rod and pull away from and even roll out of the gland's receiver groove. Ideally this drag is minimized while wiping is maximized.

As to the former sealing task, if hydraulic fluid escapes past the piston seal, then the system pump pressure can be developed on the underside of the wiper ring which will likely cause the ring to blow out of the pump jack entirely. Therefore it is important to maintain the seal between the piston ring and rod. And it is also important to exclude abrasive contaminants which otherwise tend to build up on the back side of the piston ring and can cause scoring and excessive wear between the piston ring and rod.

It is therefore an object of the present invention to provide a wiper ring with improved sealing capability and reduced drag.

It is another object of the present invention to provide a blow-out resistant wiper ring with improved sealing capability and reduced drag.

SUMMARY OF THE INVENTION

The present invention includes an anti-rotation wiper ring for mounting in a receiver groove in a gland mounted concentrically to an axially displaceable rod of a pump equipment. The wiper ring includes a flange for mounting in the gland receiver groove. A wiper lip extends radially inwardly and axially upwardly from the flange top surface to the wiper ring inner diameter. The wiper lip skims debris from the surface of the rod as it is retracted into the equipment. Various rotational forces acting on the installed ring are opposed by anti-rotation means which prevent rotation of the ring out of the receiver groove toward the rod surface.

In one embodiment, the anti-rotation means is a continuous annular ring on the flange bottom surface. The ring is not entirely in the plane of the flange bottom surface and cooperates with an interlocking non-planar interior surface of the gland receiver groove, to prevent rotation of the ring out of the receiver groove toward the rod surface. Preferably the anti-rotation means is an anchor extending axially downwardly from the flange bottom surface. The anchor has an inner radial wall on its inner diameter facing radially inwardly and extending axially downwardly for cooperation with an opposed radially outwardly facing wall of a grooved surface of the receiver groove. The anchor has a wall on its outer diameter tapering axially downwardly and radially inwardly to meet the anchor inner radial wall.

The wiper ring flange extends from the outer diameter toward the inner diameter of the ring and has a static seal formed on the flange top surface between the ring outer diameter and the wiper lip. The flange defines the ring's inner radial wall as tapering radially inwardly to the ring's inner diameter. A stabilizer device is formed on this flange wall. The stabilizer device extends radially inwardly to an intermediate inner diameter short of the ring inner diameter. The stabilizer device extends axially from the ring bottom surface up toward the wiper lip while extending from the ring tapered inner radial wall radially inwardly to a peak and then radially outwardly back to the ring tapered inner radial wall. This forms a recession between the stabilizer device and the wiper lip on the ring tapered inner radial wall for reduction of drag against the rod surface.

In a particular embodiment, the wiper ring extends between an outer diameter D1 through intermediate diameters D2-D8 to an inner diameter D9. The ring has an outer radial wall at outer diameter D1, an inner radial wall tapering radially inwardly from diameter D6 to diameter D9, an axial top surface extending radially inwardly from diameter D1 to diameter D5, a wiper arm extending axially from and over the ring axial top surface, the wiper arm outer diameter extending radially inwardly from diameter D5 to diameter D9 and the wiper arm inner diameter tapering radially inwardly from diameter D7 to diameter D9, an axial bottom surface extending radially inwardly from outer diameter D1 to diameter D6, and an anti-rotation device on the ring axial bottom surface for interlocking with a structure of the interior surface of the gland receiver groove to prevent rotation of the ring out of the receiver groove toward the rod surface.

A method of the invention includes the step of providing an anti-rotation device on the wiper ring for cooperation with a structure of the equipment for preventing rotation of the ring out of the receiver groove toward the rod surface. The method also includes the step of forming the anti-rotation device out of plane with the plane of the wiper ring's bottom surface. Preferably the method includes the step of forming the anti-rotation device as a hook structure on the ring bottom surface for mating with a catch structure on the interior surface of the receiver groove. The mating hook and catch structures anchor the wiper ring in the receiver groove against being rotated out of the groove by forces within the equipment.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF PREFERRED EMBODIMENTS

Figure 1:
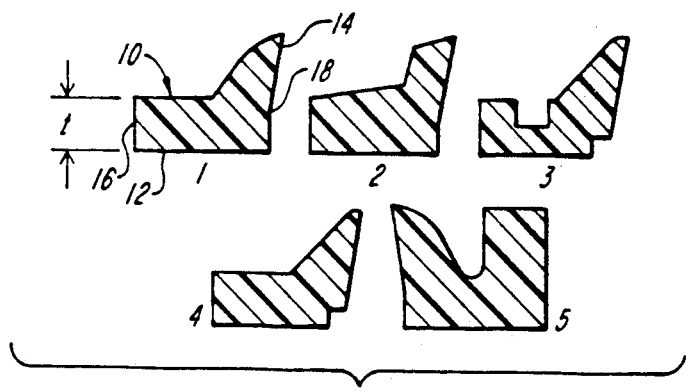
FIG. 1 shows five prior art wiper rings in side cross-section.

Five prior art wiper rings are shown in side cross-section in FIG. 1. The type 1 configuration is commonly in use, and includes a flange 10, flange bottom surface 12, and wiper lip 14. The flange bottom surface extends radially between vertical OD sidewall 16 and partly tapered ID sidewall 18, the latter sidewall tapering radially inwardly as it extends up to lip 14.

Figure 2:
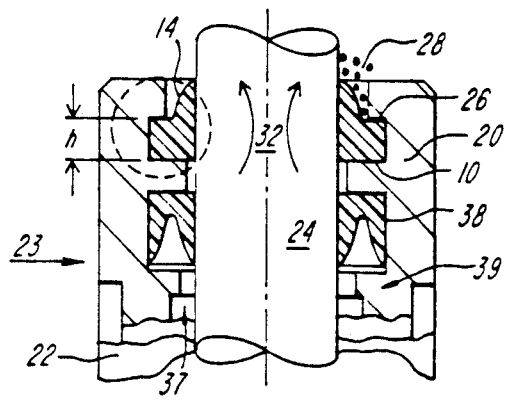
FIG. 2 is a side cross-section of prior art a pump having a type 1 wider ring installed in a gland receiver groove concentrically to the pump rod.
Figure 2A:
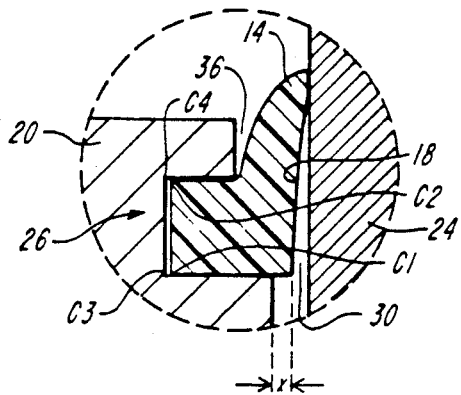
FIGS. 2(A) and 2(B) re insets showing the prior art type 1 seal wiper lip ID mating with the rod OD, and then the leakage path which may open up between the wiper ring OD and groove ID.
Figure 2B:
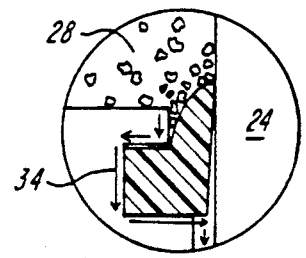

In FIG. 2, the type 1 ring is shown installed in a pump gland 20 which is mounted on the housing 22 of pump 23 concentrically to pump rod 24. The ring flange 10 is seated in a receiver groove 26 of the gland with the wiper ring's wiping lip 14 resting against rod 24 for wiping liquid or debris 28 off of the rod surface as the rod retracts into the pump. As shown in FIG. 2(A), the lower portion of tapered sidewall 18 is separated away from the surface of rod 24 (see cavity 30), so as to reduce the surface area of the lip actually in contact with the rod. This reduces drag and reduces the tendency of the ring to roll in on itself and axially outwardly as shown by arrows 32, when the drag is too great. Such rolling will pull the flange out of the groove and can open up a leakage path 34, as shown in FIG. 2(B). And even with reduced drag, leakage path 34 still may be opened up by system vibrations or rod runout (radial eccentricity). Thus the ring flange 10 must form a tight seal with the receiver groove 26.

In operation, some of the liquid or debris 28 skimmed of the rod by lip 14 can collect in the annular opening 36 in the end of the gland on the ID side of the lip. If the wiper ring flange 10 does not carefully mate within the gland's receiver groove, and if there is not a good seal thereat, then these contaminants can enter into the pump by passing along the OD of the mounted wiper ring, along leakage path 34. Thus the wiper ring is selected having an OD equal to the ID of the receiver groove 26, the flange and groove each having cooperatively mating corners, c1-c2 and c3-c4, respectively, and the flange having a thickness t about equal to the groove height h, all to assure close mating of the ring and gland and so as to limit the passage of liquid or debris thereinbetween and the pump.

The fluid 37 of the pump is sealed by piston seal 38 which retains the fluid in the pump pressure chamber 39. However some fluid may escape into cavity 30 and ultimately can apply the system pressure to the sealing side of lip 14 (i.e., the ID side) and to a piston area "x" on the overhanging portion of flange 10 which is exposed to this escaped fluid. This fluid will tend to cause the ring to roll out of the gland groove, as in the direction of arrow 32, away from groove 26, again opening up leakage path 34, and with the hydraulic pressure behind it, will likely lead to a ring blowout.

Figure 3A:
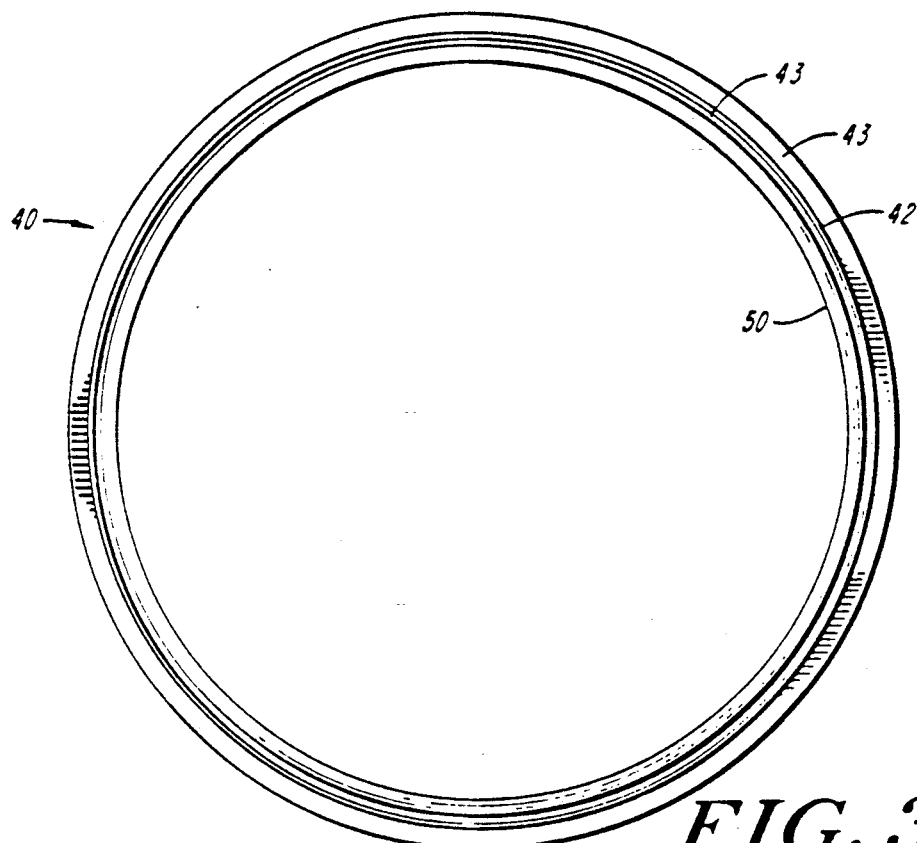
FIG. 3 (A–C) includes a top view, bottom view and side cross-sectional view of a wiper ring, according to the invention.
Figure 3B:
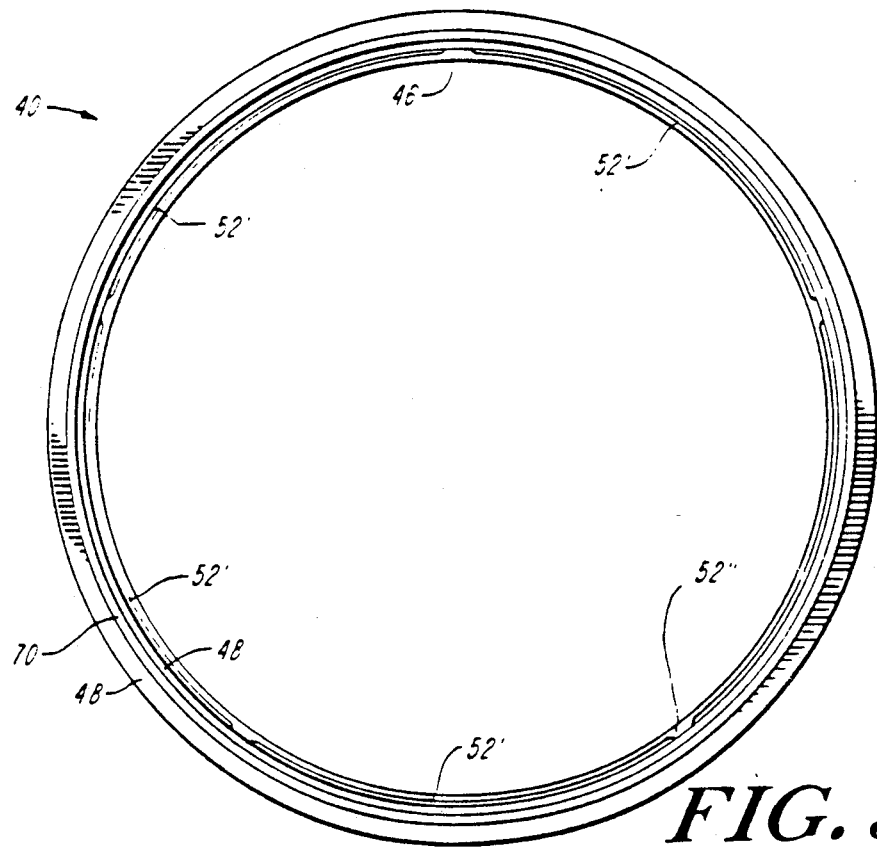
Figure 3C:
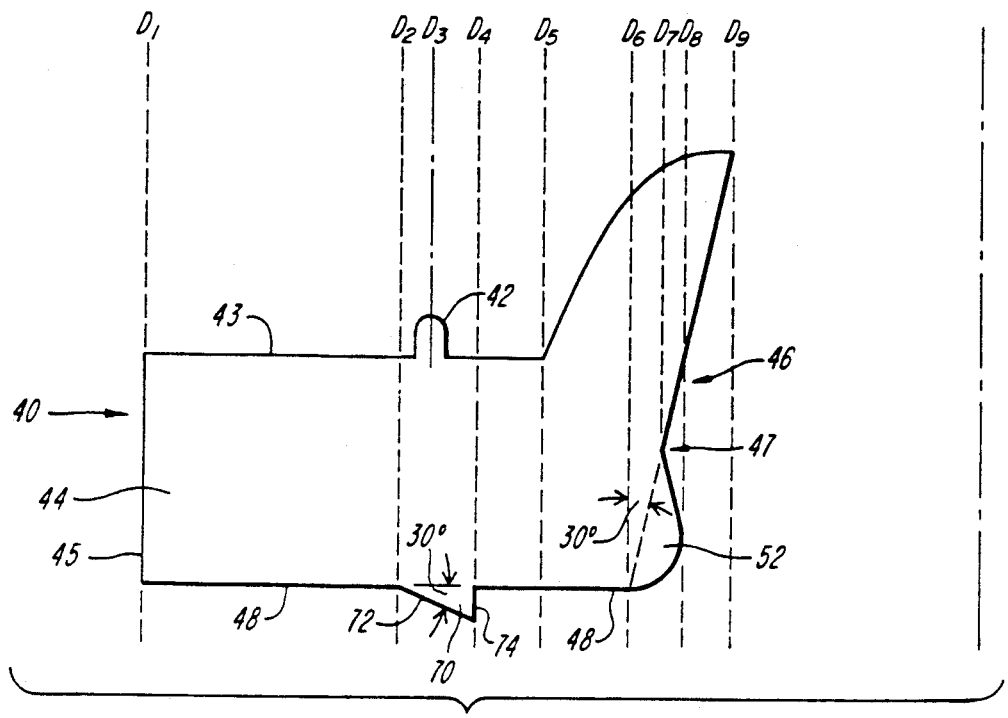
Figure 4:
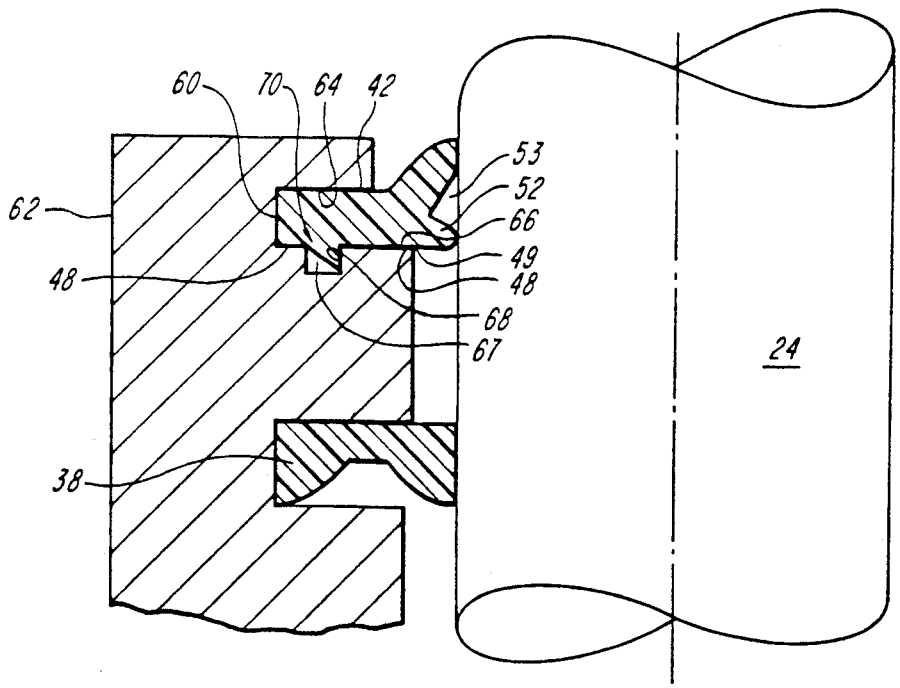
FIG. 4 is a side cross-section showing the wiper ring of FIG. 3 installed in a pump, according to the invention.
Figure 5:
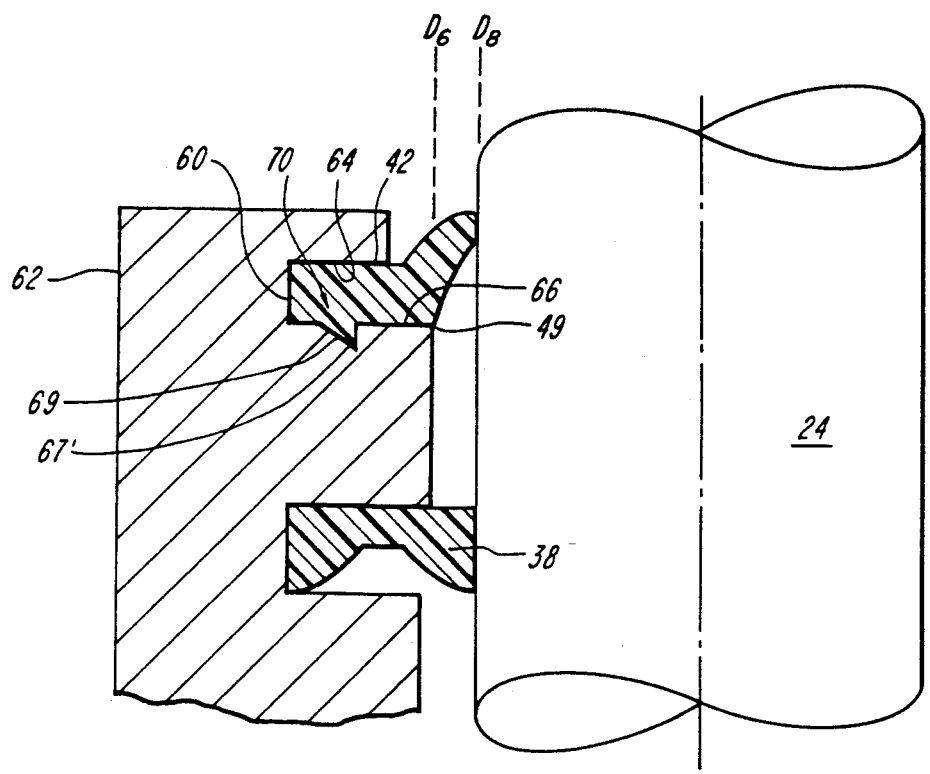
FIG. 5 is a side cross-section showing an alternative embodiment of the wiper ring installed in a pump, according to the invention.

Turning now to FIGS. 3–5, a preferred wiper ring 40 is shown. The ring is mounted in receiver groove 60 of gland 62 concentrically to rod 24. The ring side cross-section is shown in FIG. 3(C) relative to diameters D1–D9, with the ring OD formed by vertical sidewall 45 at diameter D1 and the ring ID formed by sidewall 46. Sidewall 45 nominally extends radially inwardly from diameter D6 to diameter D9. The ring top surface 43 extends radially inwardly from diameter D1 to diameter D5, from where the wiper lip 50 extends out nominally to diameter D9, although lip 50 is deflected back to diameter D8 when installed over the OD of rod 24.

A static seal 42 is formed on the top surface 43 of the ring flange 44 at diameter D3. Seal 42 forms a resilient seal with the gland groove inner surface 64, substantially reducing the possibility of opening up a leakage path 34 at that point. Preferably static seal 42 is a hemispherical ridge molded as part of the flange top surface 43. Furthermore, by use of seal 42 coupled with any of the anti-rotation features of the invention described below, the prior art-tight sealing requirement placed on cooperation of the OD of the flange mating with the ID of the gland's receiver groove is substantially relaxed.

The lower part of sidewall 46 defines an anti-rotation stabilizer device 52. This stabilizer is a broken circumferential ridge or bead on the ring ID, formed of a plurality of non-continuous raised stand-offs 52', separated by recesses 52". The flange bottom surface 48 extends from the flange OD at diameter D1 radially inwardly to diameter D6, and the bottom of the stabilizer device is nominally in plane with the plane of the flange bottom surface 48, but otherwise is out of plane therewith as it extends axially up toward the wiper lip.

The stabilizer device standoffs 52' take off from diameter D6 and round off at diameter D8 and then return to sidewall 46 at diameter D7. The axially extending sidewall 46 then tapers radially inwardly from diameter D7 to diameter D9 at a taper of approximately 30 degrees relative to the plane of the flange bottom surface 48.

The stabilizer inner diameter D8 is located radially inwardly from the ring's nominal inner diameter D9. Properly installed, the IDs of the stand-offs 52' ride on the rod OD at diameter D8, at which point the rod outer diameter and the stabilizer inner diameter dimensions are essentially equal. Preferably, the stand-offs 52' have relatively narrow and rounded peaks such that they ride along the surface of the rod essentially without drag or binding. In any event, the stand-offs oppose the tendency of the ring to roll out of the gland as caused either by drag on the lip ID (sidewall 46) or from system pressure from hydraulic fluid escaped past piston seal 38. Hence, with ring 40 installed in the pump, the lip deflects along the rod OD while the stand-offs ride on the rod surface. However, a portion 47 of sidewall 46 between diameters D7 and D8, and axially extending between the lip and stand-offs, remains off of the rod surface, thus forming a recession 53 between the ring ID and rod OD, so as to minimize drag. Recesses 52" permit system pressure to escape between and past the standoffs 52' and between the wiper lip ID and rod OD, while the standoffs prevent rotation of the wiper ring out of the gland's receiver groove.

Alternatively, in an embodiment not employing the stabilizer device 52, as shown in FIG. 5, an anti-rotation improvement is obtained where the gland groove bottom inner surface 66 and inner diameter corner 49 of the flange bottom surface 48 both terminate at inner diameter D6. This eliminates any piston area created by any overhanging portion of the flange bottom surface, thus eliminating a source of rotation and possibility of blow out.

An additional anti-rotation device is also provided in the form of an anchor ring 70 extending down from the flange bottom surface 48. The anchor ring has a tapered outer diameter face 72 beginning at diameter D2 and downwardly rising out of the plane of the flange bottom surface while extending radially inwardly at a taper of approximately 30 degrees, meeting downwardly axially extending radial face 74 at diameter D4. The anchor ring cooperates with a corresponding anchor groove 67 formed in surface 66 of the gland's receiver groove 60.

Anchor groove 67 and anchor ring 70 act as a hook and catch, with the tapered face 72 easing and enabling snap-in installation of the ring. As installed, anchor face 74 abuts an opposing radial face 68 of groove 67, and consequently rotation of the ring out of receiving groove 62 is substantially opposed. Furthermore, if anchor ring 70 is continuous, it will form a seal against gland groove face 68, again keeping the leakage path 34 closed, even in the unlikely event of leakage past static seal 42. The locking groove 67 is shown as rectangular in FIG. 4. A triangular locking groove 67' is shown in FIG. 5 having a tapered face 69 corresponding to the tapered face 72 of anchor ring 70.

In operation of this embodiment, the wiper ring flange is snapped into the gland's receiver groove, wherein the anchor on the flange bottom mates with the gland locking groove on the bottom of the gland receiver groove, and this assembly is then fitted over the rod and secured to the pump housing. The wiper tip keeps contaminants from entering into the pump along the rod OD as the rod is retracted into the pump and the static seal keeps the potential leakage path closed in between the wiper ring OD and gland receiver groove ID. The gland locking groove secures the wiper ring against rotation and provides a second seal against opening of such leakage path.

As the pump rod is extended out of the pump, the standoffs of the stabilizer device allow the rod to glide by while the recession above the standoffs reduces drag. The stabilizer device counters rotation of the ring out of the receiver groove toward the rod surface. The reliefs between the standoffs harmlessly pass any pressure which may be escaping the piston seal, and flush mounting of the bottom ID corner of the flange and gland's receiver groove eliminate the possibility of a piston area being defined by escaping pump fluid as would tend to rotate the ring out of the gland receiver groove.

As a benefit of the foregoing, the flange OD no longer has a primary sealing function, and therefore can be radially undersized perhaps by a percent or two. Such undersizing improves operational tolerance of the wiper ring to rod runout, and further lessens the likelihood that a leakage path will open between the gland's receiver groove and the wiper ring OD.

It will be understood that the above description pertains to only several embodiments of the present invention. That is, the description is provided by way of illustration and not by way of limitation. For example, while pump jacks have been described, various other equipment may also benefit from the present invention. Furthermore, while the terms up, down, upwardly, downwardly, top and bottom have been used herein, it will be appreciated that these are relative terms meant to convey location of structure relative to the wiper lip, which conventionally defines the top of the ring. As well, the terms hook and catch are relative and do not limit the disclosure to a single configuration. The scope of the invention, therefore, is according to the following claims.

What is claimed is:

1. An anti-rotation wiper ring for mounting in a receiver groove in a gland of an equipment having a rod which is selectively displaceable into or out of the equipment along a longitudinal axis, the rod having an outer diameter and the wiper ring being mountable thereover at an inner diameter of the ring, the gland and the wiper ring being mounted concentrically to the rod, the wiper ring comprising a flange for selectively and detachably mounting in the gland receiver groove, the flange having a generally radially extending bottom surface and a generally radially extending top surface, and a wiper lip which extends radially inwardly and axially upwardly from the flange top surface to the wiper ring inner diameter, the wiper lip being for skimming debris from the surface of the rod as it is retracted into the equipment, and anti-rotation means for preventing rotation of the ring out of the receiver groove toward the rod surface, the anti-rotation means being formed on the flange bottom surface and out of plane with the plane of the flange bottom surface and being selectively detachable from the gland receiver groove.

2. The wiper ring of claim 1 wherein the anti-rotation means comprises a continuous annular ring on the flange bottom surface.

3. The wiper ring of claim 1 wherein the anti-rotation means is formed on the flange bottom surface and defines a non-planar anti-rotation structure for interlocking mating with a non-planar interior surface of the gland receiver groove, to prevent rotation of the ring mounted in the receiver groove out of the receiver groove toward the rod surface.

4. The wiper ring of claim 2 wherein the anti-rotation means comprises an anchor extending axially downwardly from the flange bottom surface, the anchor comprising an inner wall on its inner diameter facing radially inwardly and extending axially downwardly, the anchor further comprising a wall on its outer diameter tapering axially downwardly and radially inwardly to meet the anchor inner wall.

5. The wiper ring of claim 1 wherein the flange extends from the outer diameter toward the inner diameter of the ring, further comprising a static seal formed on the flange top surface between the ring outer diameter and the wiper lip.

6. The wiper ring of claim 1 wherein the flange extends from the outer diameter toward the inner diameter of the ring, the flange having an inner radial wall tapering radially inwardly to the ring inner diameter, the inner radial wall defining a stabilizer device extending radially inwardly to an intermediate inner diameter short of the ring inner diameter.

7. The wiper ring of claim 6 wherein the stabilizer device comprises a plurality of raised stand-offs which define circumferentially between themselves at least one axially extending pressure relief path.

8. The wiper ring of claim 6 wherein the stabilizer device comprises a plurality of raised stand-offs circumferentially separated from each other and forming a discontinuous ridge on the ring inner diameter.

9. The wiper ring of claim 6 wherein the stabilizer device extends axially from the ring bottom surface radially inwardly to a radially extending peak and then radially outwardly to the ring tapered inner radial wall.

10. The wiper ring of claim 9 wherein an axially extending recession is formed on the ring tapered inner radial wall above the stabilizer device and recessed from the tip of the wiper lip at the ring inner diameter.

11. The wiper ring of claim 6 further comprising a static seal formed on the flange top surface between the ring outer diameter and the wiper lip.

12. An anti-rotation wiper ring for mounting in a receiver groove in a gland mounted concentrically to an axially displaceable rod of a pressure actuated equipment, the wiper ring having a wiper lip for wiping debris off of the surface of the rod as it retracts into the equipment, the wiper ring extending between an outer diameter D1 through intermediate diameters D2–D8 to an inner diameter D9, the ring having an outer radial wall at outer diameter D1,
an inner radial wall tapering radially inwardly from diameter D6 to diameter D9,
an axial top surface extending radially inwardly from diameter D1 to diameter D5,
a wiper arm extending axially from and over the ring axial top surface, the wiper arm outer diameter extending radially inwardly from diameter D5 to diameter D9 and the wiper arm inner diameter tapering radially inwardly from diameter D7 to diameter D9,
an axial bottom surface extending radially inwardly from outer diameter D1 to diameter D6, and
anti-rotation means located on the ring axial bottom surface for interlocking with a structure of the interior of the gland receiver groove to prevent rotation of the ring out of the receiver groove toward the rod surface, the anti-rotation means being selectively detachable from the gland receiver groove.

13. An anti-rotation wiper ring system for keeping foreign matter from being carried by an axially displaceable rod of an equipment into the equipment housing, the system comprising a wiper ring inner diameter defining a wiper lip for skimming debris off of the rod as it retracts into the equipment housing, a gland for mounting to the equipment housing concentrically to the equipment rod, the gland having a central annulus and defining a receiver groove on an inner wall of the annulus for mounting of the wiper ring concentrically to the equipment rod, the receiver groove interior surface defining an anti-rotation structure, and
the wiper ring comprising a radially extending axial bottom surface having an anti-rotation means located thereon for selectively detachable interlocking mating with the gland groove anti-rotation structure, to prevent rotation of the wiper ring out of the receiver groove toward the rod when the wiper ring is mounted in the receiver groove.

14. The wiper ring of claim 13 wherein the anti-rotation means comprises an anchor extending axially downwardly from the ring bottom surface, the anchor forming a continuous annular ring with a wall on the anchor annular ring inner diameter facing radially inwardly and extending axially downwardly.

15. The wiper ring of claim 13 wherein the ring defines a flange which extends from an outer diameter toward the inner diameter of the ring, the flange having an axially extending top surface, and further comprising a static seal formed on the flange top surface between the ring outer diameter and the wiper lip.

16. The wiper ring of claim 13 wherein the ring defines a flange which extends from the outer diameter toward the inner diameter of the ring, the flange having an inner radial wall tapering radially inwardly to the ring inner diameter, the inner radial wall having a stabilizer device extending radially inwardly to an intermediate inner diameter short of the ring inner diameter.

17. The wiper ring of claim 16 wherein the stabilizer device comprises a plurality of raised stand-offs which define circumferentially between themselves respective axially extending pressure relief paths, wherein the stabilizer device extends axially from the ring bottom surface radially inwardly to a radially extending peak and then radially outwardly to the ring tapered inner radial wall, and wherein an axially extending recession is formed between the stabilizer device and the wiper lip on the ring tapered inner radial wall.

18. The wiper ring of claim 13 wherein the ring defines a flange which extends from an outer diameter toward the inner diameter of the ring, wherein the flange further comprises an axially extending top surface from which the wiper lip extends axially upwardly and radially inwardly to the ring inner diameter, and further comprising a static seal formed on the flange top surface between the ring outer diameter and the wiper lip.

19. A method for preventing rotation of a wiper ring out of a receiver groove formed in a sidewall wall of a piston chamber of a pump equipment gland, the gland being for mounting the wiper ring concentrically to an axially displaceable piston rod of the equipment, the wiper ring having a lip formed by the conjunction of its inner and top surfaces for skimming debris from the surface of the rod as the rod retracts axially into the equipment, the method comprising the step of providing an anti-rotation device on the ring for selectively detachable cooperation with an anti-rotation structure formed within the receiver groove for preventing rotation of the ring out of the receiver groove toward the rod surface, further including the step of forming the anti-rotation device on the ring bottom surface and out of plane with the plane of the ring bottom surface.

20. The method of claim 19 further comprising the step of forming the anti-rotation device as a hook structure on the ring bottom surface for mating with a catch structure on the interior of the sidewall receiver groove, the mating hook and catch structures selectively detachably anchoring the wiper ring in the receiver groove against being rotated out of the groove by forces within the equipment.

* * * * *